United States Patent [19]
Kardach et al.

[11] Patent Number: 5,473,767
[45] Date of Patent: Dec. 5, 1995

[54] METHOD AND APPARATUS FOR ASYNCHRONOUSLY STOPPING THE CLOCK IN A PROCESSOR

[75] Inventors: James P. Kardach, San Jose; Tosaku Nakanishi; Jimmy S. Cheng, both of Cupertino, all of Calif.

[73] Assignee: Intel Corporation, Santa Clara, Calif.

[21] Appl. No.: 970,576

[22] Filed: Nov. 3, 1992

[51] Int. Cl.⁶ .............................. G06F 1/06; G06F 11/00
[52] U.S. Cl. .............................. 395/550; 368/10; 371/14; 395/650; 395/375
[58] Field of Search ..................................... 395/550, 650, 395/725; 364/900; 371/14

[56] References Cited

U.S. PATENT DOCUMENTS

| | | | |
|---|---|---|---|
| 4,835,728 | 3/1989 | Si et al. ................................. | 364/900 |
| 4,916,697 | 4/1990 | Roche et al. ............................ | 371/14 |
| 5,175,853 | 12/1992 | Kardach et al. ........................ | 395/650 |
| 5,189,647 | 2/1993 | Suzuki et al. ........................... | 368/10 |
| 5,276,888 | 1/1994 | Kardach et al. ........................ | 395/725 |
| 5,297,276 | 3/1994 | Millar et al. ............................ | 395/550 |
| 5,359,727 | 10/1994 | Kurita et al. ............................ | 395/550 |

*Primary Examiner*—Kevin A. Kriess
*Assistant Examiner*—Majid A. Banankhah
*Attorney, Agent, or Firm*—Blakely, Sokoloff, Taylor & Zafman

[57] ABSTRACT

An apparatus and method for controlling the stopping of the clock signal utilized by the processing unit of a computer system comprises the use of a novel external pin which can be enabled to initiate a sequence of events that results in the halting of the internal clock signal. The invention includes a microcode engine that responds to the assertion of the external pin by executing a sequence of steps which stops the current instruction on an instruction boundary. A logic circuit then generates a signal that masks the clock signal produced by the system's phase-locked loop. An interrupt mechanism is also utilized to prioritize the occurrence of the external signal among other system interrupts. The interrupt mechanism insures that the processor never has its clock stopped in the middle of a bus cycle.

22 Claims, 3 Drawing Sheets

FIG_1 (PRIOR ART)
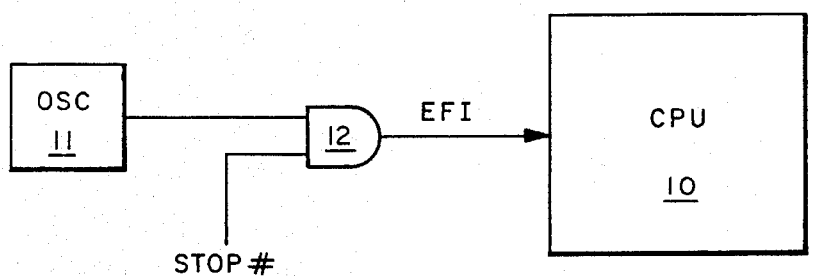
FIG_2
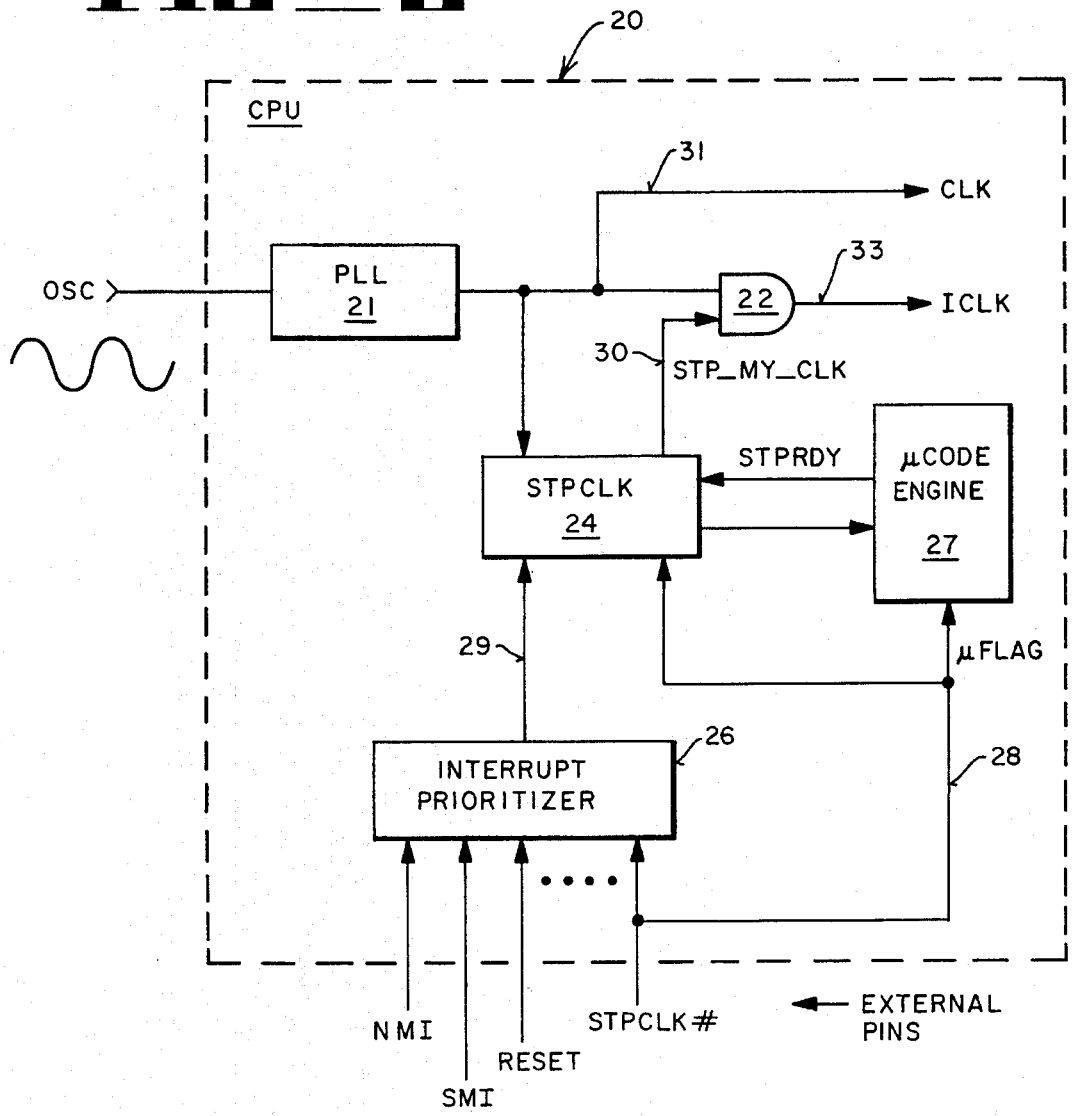

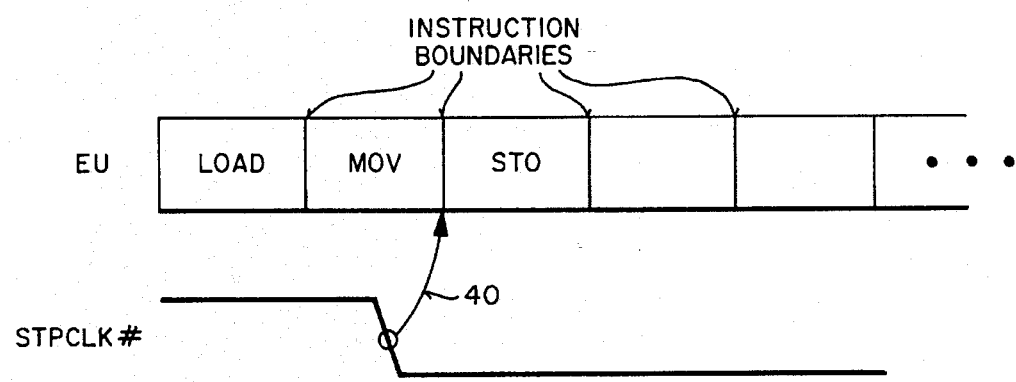
FIG_3
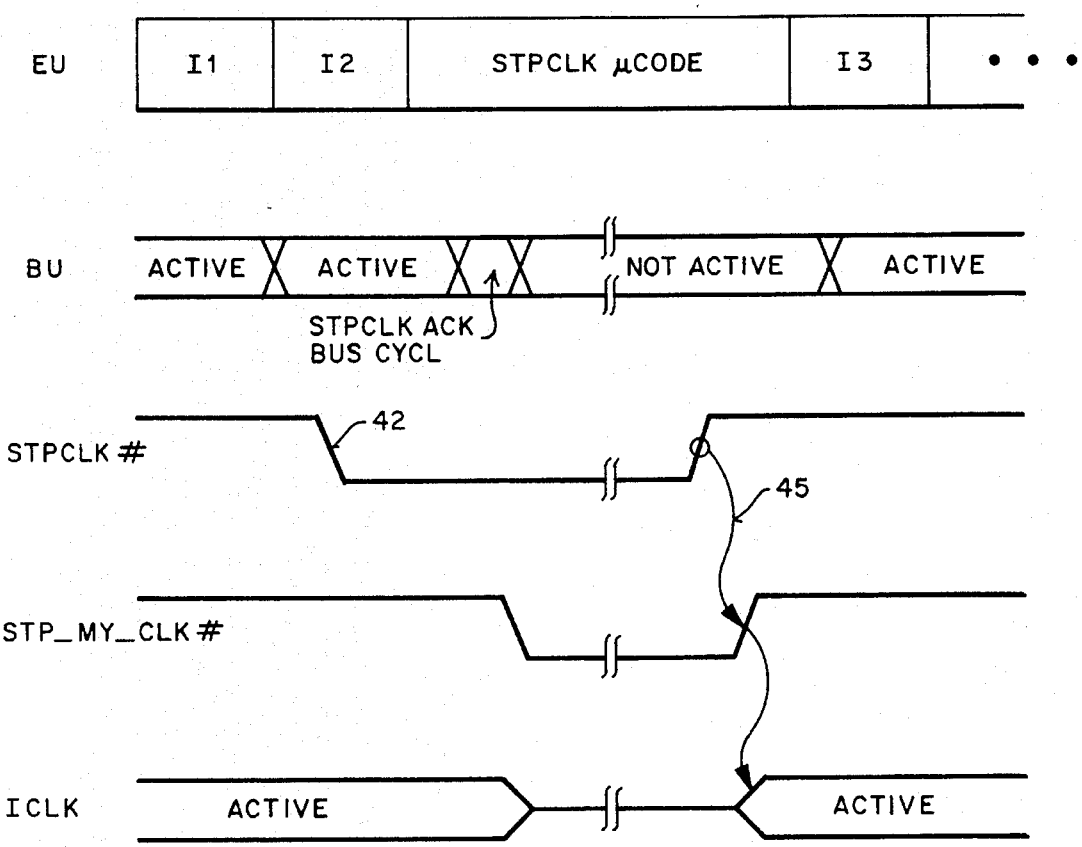
FIG_4

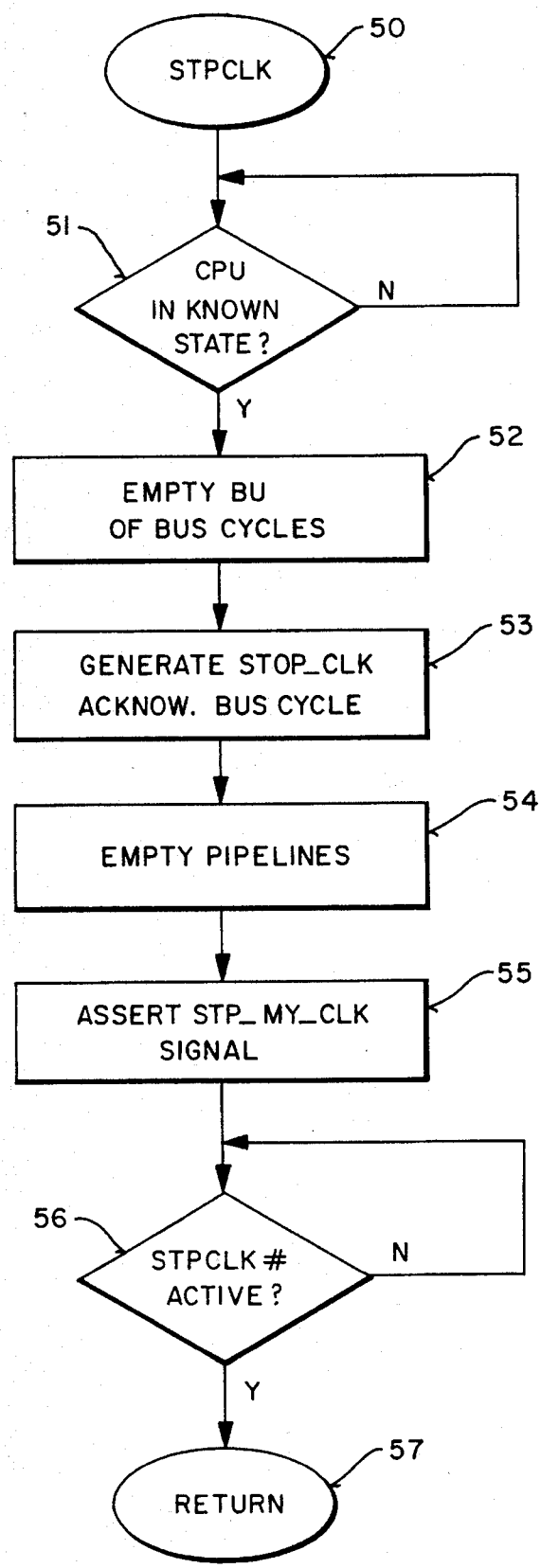

METHOD AND APPARATUS FOR ASYNCHRONOUSLY STOPPING THE CLOCK IN A PROCESSOR

FIELD OF THE INVENTION

The present invention relates to the field of computers and computer systems. More specifically, the invention relates to features incorporated within a computer system or within a microprocessor for controlling clocking signals.

BACKGROUND OF THE INVENTION

The related technologies of computer and microcomputer design have made incredible advances in the past several decades. New architectural ideas combined with advances in integrated circuit technology have created a series of machines which achieve remarkable performance results.

One way that computer architects and designers can further improve the performance of their machines is by creating an apparatus or mechanism for stopping a processor regardless of the current instruction it is executing. Stopping a processor's operation is useful, for example, when testing the state of the processor. One of the problems that has plagued previous technologies is that a processor's state could only be tested, and therefore guaranteed to be valid, when the internal clock signal was stopped and certain predetermined conditions were satisfied. By way of example, such conditions usually occurred during a HALT state or during an input/output (I/O) read. Under these conditions, the processor's state was known, so that the processor could be tested at that point. The problem with this prior art approach, however, is obvious; namely, that testing a processor only when a certain number of predetermined conditions are satisfied is highly impractical.

The alternative to stopping a processor on predetermined conditions is to stop the processor asynchronously by disabling the externally-generated signal used as a reference to generate the internal clock rate of the device. The drawback to stopping the processor asynchronously in this manner is that the processing unit is very often in the middle of executing one of its instruction. In the middle of an instruction or micro-instruction, both internal and external buses are precharged. Stopping the processor in the middle of a bus cycle discharges the bus, with a resultant loss of the information being transferred.

Another problem with asynchronously disabling the external reference frequency generator involves the fact that most microprocessors and computer systems utilize a phase-locked Iccp (PLL) circuit to multiply the reference frequency by some factor to generate the system's internal clock rate. The internal clock signal is utilized by the central processing unit (CPU) of the computer during the execution of its various functions and instructions. The problem arises that if the clock is stopped externally, then the internal phase-locked Iccp circuitry is likewise disabled. Under such circumstances, re-enabling the external reference frequency does not produce an instantaneous response from the PLL; that is, the PLL requires some fixed time period (e.g., several hundred milliseconds) to stabilize. During this start-up time period, spurious signals and glitches am commonly generated, leading to unpredictable results. Thus, starting and stopping of the processor's clock by disabling the external reference input frequency results in a loss of psuedo-instantaneous response.

What is needed then is a means for stopping the CPU's clock at any time, regardless of the instruction that the processor is presently executing, while guaranteeing that the processor is in a known state. As will be seen, the present invention allows the user to stop the clock of a processor within a computer system asynchronously, while still guaranteeing that the state of the processor is preserved. Guaranteeing the processor's environment just previous to stopping the processor's clock allows the device to be tested in a manufacturing environment. Another advantage of the present invention is that the processor can be re-enabled without having to restart the system's PLL circuitry. This obviates the need to otherwise wait an inordinate length of time for a stable clock signal to be generated.

SUMMARY OF THE INVENTION

A computer system which includes a processor is described. The invention covers an apparatus and method of controlling the stopping of the clock utilized by a central processing unit (CPU) of a computer system. While stopping the clock, the invention also guarantees the state of the processor. In one embodiment, the invention comprises the use of a novel external pin which can be enabled to initiate a sequence of events that results in the halting of the internal clock signal coupled to the CPU.

In an exemplary embodiment, the invention includes a microcode engine coupled to receive the signal provided by the external pin. In response, the microcode engine then executes a sequence of steps which stops the execution of the current instruction on an instruction boundary. The external pin is also coupled to a logic circuit which generates a signal that masks the CPU's clock. An interrupt mechanism is also utilized to prioritize the occurrence of the external stop_clock signal among other system interrupts. The interrupt mechanism insures that the processor does not stop its clock in the middle of a bus cycle.

One of the added benefits of the present invention is that it may be utilized to emulate the division of the clock (e.g., divide by 2, 4etc.) by throttling the clock signal on for a given time period, and then off for another time period. This has a number of advantages. First, the PLL that generates the internal clock does not need to be modified to allow the division of clock cycles. This means that the present invention allows stopping and starting of the clock function without alteration of the system's phase-lock loop circuitry.

Furthermore, the present invention makes bus designs across multiple time domains much easier; that is, going from the local CPU bus to a standard frequency bus (e.g., like an 8 Mhz ISA bus) is greatly simplified. This result is achieved because of two primary reasons. First, because the clock is stopped on instruction boundaries, bus cycles are never accidentally extended. This means that slave logic coupled to the processor's bus need not be designed in a way that comprehends master extended bus cycles. The second reason simply has to do with the fact that the processor's bus always operates at the same frequency. In prior art designs where the processor's clock signal was divided, as opposed to being throttled, logic coupled to the processor's bus had to comprehend not only the processor's maximum frequency, but all potential divided clock frequencies as well. On the other hand, devices coupled to a throttled processor's bus only see bus cycles occurring at the maximum frequency.

Another advantage of the invention is that the bus connected to the CPU is made much easier to design since the CPU is not required to have its clock stopped in the middle of a bus cycle. Guaranteeing the state of the processor just prior to stopping the processor's internal clock signal makes the computer system highly testable in a manufacturing environment.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

FIG. 1 illustrates prior art method of stopping the clock signal coupled to a central processing unit of a computer system.

FIG. 2 is a block diagram of one embodiment of the present invention.

FIG. 3 illustrates the relationship of the STPCLK pin to a set of instructions being executed within the execution unit of a computer system.

FIG. 4 is a timing diagram which illustrates the sequence of events which takes place within the computer system when the inventive STPCLK pin is asserted and then deasserted.

FIG. 5 is a flow chart depicting the sequence of events involved in stopping of a processor's internal clock signal.

DETAILED DESCRIPTION

An apparatus and method for stopping the clock signal coupled to a central processing unit of a computer, regardless of the instruction the processing unit is presently executing, is described. In the following description, numerous specific details are set forth such as specific event types, circuits, instruction types, etc., in order to provide a thorough understanding of the present invention. It will be obvious, however, to one skilled in the art that these specific details may not be needed to practice the present invention.

FIG. 1 illustrates a prevalent prior art technique for stopping or halting the clock signal coupled to a central processing unit (CPU) within a computer system. By way of example, the scheme illustrated in FIG. 1 is commonly found in such microprocessors as the 80286 microprocessor manufactured by Intel Corporation. As shown, an oscillator 11 provides a periodic signal coupled to CPU 10 through AND gate 12. The output of AND gate 12 represents the external frequency input (EFI) provided to CPU 10. The other input of AND gate 12 is coupled to a signal labeled STOP#, which provides a means for decoupling the EFI signal from CPU 10. If the STOP# signal is low, then the output of AND gate 12 will be low regardless of the signal provided by oscillator 11. On the other hand, if the STOP# signal is at a logical high level, then the output of oscillator 11 will be coupled directly to CPU 10.

As discussed above, there exists a variety of problems associated with the prior art scheme of FIG. 1. For instance, testing the CPU under such a scheme is difficult since it is virtually impossible to test the stopping of the clock on all combinations of instructions which might cause the product to fail. Another related problem is that stopping of the clock in the manner shown in FIG. 1 does not preserve the state of any of the buses in the computer system. This means that the clock could be stopped in the middle of a bus cycle, in which case the information associated with that bus cycle would be irretrievably lost.

With reference now to FIG. 2, a block diagram of the currently preferred embodiment of the present invention is shown. The present invention is preferably implemented on a single integrated circuit (IC) 20 which includes a CPU driven by an internal clock signal, labeled ICLK, on line 33. The internal clock signal of the CPU is generated by means of an external reference oscillatory signal which drives a phase-lock Iccp (PLL) circuit 21. PLL 21 multiplies the reference frequency by a predetermined factor to produce a clock signal along line 31, coupled to one input of AND gate 22. Note that line 31 is labeled CLK; it is this signal which provides the clock signal to the computer's circuits which cannot tolerate an interruption in the clock signal. For example, a constant clock signal is often required for various cache operations, snooping logic, hold, hold acknowledge operations and arbitration logic. Functions such as these receive the CLK signal.

In the current embodiment, it is only the ICLK signal which is interrupted or halted in accordance with the present invention. The ICLK signal, shown being provided on line 33, clocks the vast majority of CPU operations, including program and instruction execution. As shown in FIG. 2, it is the ICLK signal that is selectively masked by AND gate 22. This masking operation is achieved by taking line 30 to a logical low potential, i.e., active low. Line 30 is labeled as STP_MY_CLK and is provided as an output from the STPCLK logic block 24. The STPCLK logic block 24 includes an ordinary state machine which is coupled to receive the CLK signal provided by PLL 21. In addition, STPCLK block 24 receives inputs from interrupt prioritizer 26 along line 29, from microcode engine 27, and also from the external STPCLK pin along line 28. Likewise, line 28 is also shown being coupled to microcode engine 27 and interrupt prioritizer 26.

It should be understood that the present invention represents a distinct change from the prior art approach in several respects. To begin with, instead of decoupling the external reference frequency signal from the processor—as shown in the prior art—the present invention utilizes an internal mechanism for decoupling the internal clock signal without disturbing the operation of the phase-lock loop. At the same time it guarantees that the clock is stopped in a known state (e.g., on an instruction boundary).

Note also that the embodiment shown in FIG. 2 includes an interrupt prioritizer 26. Prioritizer 26 controls events other than branches that change the normal flow of instruction execution. Interrupt prioritizer 26 operates by detecting interrupt conditions external to integrated circuit 20, and then granting a priority status to each of those interrupt events. By way of example, in FIG. 2 prioritizer 26 is shown receiving a plurality of interrupt signals, including a non-maskable interrupt signal (NMI). A NMI signal may, for instance, represent a parity error generated by system logic. Also shown are interrupt signals generated by the system management (SMI), and a RESET interrupt signal.

In the embodiment of FIG. 2, the STPCLK# signal is shown being routed to interrupt prioritizer 26 as well as to STPCLK logic block 24 and microcode engine 27. When the external STPCLK# signal is asserted, it generates an interrupt to microcode engine 27. This interrupt will be recognized on the next instruction boundary and is granted a high interrupt priority status by interrupt prioritizer 26. Microcode engine 27 includes a STPCLK microcode entry point and microcode program, designed to implement a number of specialized tasks associated with stopping of the internal clock. By way of example, when the STPCLK# signal is asserted, control is passed to the STPCLK microcode handler on the very next instruction boundary. The STPCLK microcode then waits until the prefetcher is idle and then sets an internal STPRDY bit. The STPRDY bit is shown coupled to STPCLK logic block 24. The STPRDY signal from the processor indicates that the ICLK signal is ready to be stopped. Engine 27 then initiates execution of a microcode Iccp which examines the STPCLK micro-flag (i.e., driven by the STPCLK# pin). When the STPCLK# signal becomes inactive, control then falls out of the STPCLK microcode Iccp and the processor begins executing the next instruction in the sequence of instructions given by the user code.

At this point of the process, the STPCLK logic block 24,—upon seeing both the STPCLK# and STPRDY signals active,—stops the internal clock to the CPU core by forcing line 30 to a low logic potential. With the STP_MY_CLK signal at a logical low potential, the internal clock signal, ICLK, becomes inactive. Finally, when the STPCLK logic block 24 recognizes that the STPCLK# signal is externally deactivated, it then restarts the clock to the processor by de-asserting the STP_MY_CLK signal.

It will be appreciated by practitioners in the art that the use of an interrupt prioritizer in the present invention insures that the processor will be testable, since every time the clock is stopped the processor will be in a known state. Internally, the STPCLK pin is treated as if it were any other interrupt generated by system logic. Externally, of course, the STPCLK# pin appears like any other external input to the processor. When the STPCLK# pin is asserted, the CPU halts its internal clock without interfering with either the external reference oscillatory signal or the operation of the internal PLL. When the STPCLK# pin is deasserted, the CPU then restarts its internal clock.

It should also be apparent from the above discussion that any user could assert the STPCLK# pin active so that internally the processor would stop its clock. In addition, the STPCLK microcode might include micro-instructions to generate a bus cycle which would acknowledge that the processor is in fact stopping its clock (i.e., an acknowledge bus cycle). For example, issuing an acknowledge bus cycle could be important at the system level.

One of the ways in which the present invention is especially useful is in laptop computer systems in which power management is a primary consideration. In such a system, external logic could be used to disable the internal clock function of the CPU when the computer system was idle or otherwise not in use. When the external logic detects an event that normally would wake up the processor, the STPCLK# pin would then be de-asserted so that the processor could then resume operating without the need for a lengthy start-up period.

With reference now to FIG. 3, there is shown an exemplary timing diagram illustrating the relation of the STPCLK# pin to a normal sequence of instructions being executed in the execution unit of a microprocessor. Essentially, FIG. 3 illustrates the STPCLK# pin transitioning from a logical high to a logical low level, where a logical low level represents an active state. As soon as the STPCLK# pin transitions low, a STPCLK interrupt signal is generated on the next instruction boundary. At this point, the microcode engine recognizes that a jump to the STPCLK microcode program is to occur. This activity is shown occurring in FIG. 3 by arrow 40. Note that in FIG. 3, the STPCLK# pin is asserted in the middle of a MOV instruction; however, the internal clock signal of the processor is not halted until the end of the current instruction, i.e., the instruction boundary before the next STO instruction.

The STPCLK microcode program performs several important functions in the current embodiment. To begin with, all of the pipelines within the processor are flushed and then idled. Preferably, the microcode would then indicate to the bus unit to execute a STPCLK acknowledge cycle. After that, the microcode then indicates to the STPCLK logic block 24 to stop the internal clock by asserting the STP_MY_CLK signal on line 30 (see FIG. 2). At this point, the microcode engine simply waits until the STPCLK# pin is deasserted; that is, it simply loops on itself until the user or system decides to restart the internal clock.

When the STPCLK# pin is de-asserted, the STPCLK logic block 24 automatically restarts the clock by deactivating the STP_MY_CLK signal. During the time that the internal clock signal is halted, PLL 21 remains active so that the CLK signal provided on line 31 is also active. After the STPCLK# pin has been deasserted, the microcode engine detects that the ICLK signal is now active and generates a return. Following the return, the next instruction in the normal sequence of instructions can begin execution.

The present invention ensures that the processor is testable because it is always in a known state (i.e., the STPCLK microcode stops execution on an instruction boundary) whenever the ICLK signal is stopped. Furthermore, all pipelines and instruction queues are flushed by the microcode program. Microcode control also guarantees that execution is never halted in the middle of a bus cycle. This eliminates any precharging problems associated with bus cycles or pipeline stages. Because the STPCLK pin provides control of the ICLK signal at a point in the circuit beyond the phase-lock loop, this also permits an overdrive strategy, where in a new processor can be inserted where the PLL is internally multiplying the clock by some factor (e.g., 2X).

To better understand the operation of the present invention consider the example of FIG. 4 and the flowchart of FIG. 5. FIG. 4 illustrates the timing relationship of the sequence of events which typically occurs whenever the internal clock of the processor is to be stopped. In FIG. 4, the execution unit (EU) is shown having three current instructions, I1, I2, and I3. These instructions may be part of a sequence of instructions currently being executed by the processor. The STPCLK microcode program is shown being run between instructions I2 and I3.

In the example of FIG. 4, the STPCLK# pin is shown being asserted by the high-to-low transition 42 which occurs during the middle of instruction I2. The assertion of the STPCLK# pin is shown by ellipse 50 in FIG. 5. When the STPCLK# pin is asserted, it sets a microflag in the microcode engine, and also signals the state machine in the STPCLK logic block. Interrupt prioritizer 26 makes sure that the microcode engine recognizes this input as an interrupt to be asserted at the next instruction boundary. Note that FIG. 4 illustrates the STPCLK# signal being recognized on the instruction boundary following the execution of instruction I2. It is appreciated that there is an associated set-up time between the time that the STPCLK# pin is asserted, and the time that interrupt prioritizer 26 grants it priority status.

On the instruction boundary following the I2 instruction, the microcode engine determines that the STPCLK interrupt is pending and jumps to the STPCLK microcode program. The STPCLK microcode program then makes sure that the CPU is in a known and stable state prior to halting to the internal clock signal. This is shown occurring in FIG. 5 at decision block 51. Once the CPU is in a known state on an instruction boundary, the STPCLK microcode program empties the bus unit of any outstanding bus cycles, generates a stop_clock acknowledge bus cycle, and then empties the internal pipelines. This is shown occurring in FIG. 5 by blocks 52, 53 and 54. The STPCLK microcode program also stops the prefetcher from prefetching. In a preferred implementation, once all bus activity has been halted, a STPCLK acknowledge bus cycle can be run. The STPCLK ACK bus cycle is shown occurring in FIG. 4 just prior to the bus unit being deactivated.

What happens next is that the STPCLK microcode program tells the STPCLK logic block to assert the STP_MY_CLK signal, thereby masking the ICLK. FIG. 4 shows the STP_MY_CLK# signal going low just after the STPCLK ACK bus cycle is completed. At the same time, the ICLK signal is shown being deactivated. Once the STP_MY_CLK signal has been asserted, the ICLK signal to the CPU is halted and CPU logic operation ends. Assertion of the STP_MY_CLK signal is represented in the flowchart of FIG. 5 by block 55.

At this stage, the microcode program simply checks to see whether the STPCLK# pin is still active (e.g., decision block 55 in FIG. 5). Once the STPCLK# pin is de-asserted by external logic, the CPU clock is restarted and execution of the next instruction (I3) is returned. This is shown occurring at ellipse 57 in FIG. 5. Arrow 45 in FIG. 4 shows how the low-to-high transition of the STPCLK# pin initiates the sequence of events which results in de-assertion of the STP_MY_CLK signal and reactivation of the ICLK to the CPU. After ICLK is activated once again, bus activity also resumes.

Note that with the clock restarted, the microcode engine detects that the STPCLK signal has been deasserted and ends the STPCLK microcode sequence so that the CPU can execute the next instruction. If the CPU had stopped its clock from a HALT state, then it would be necessary to set the CPU's context (i.e., register states, etc.) so that upon leaving the STPCLK microcode program, the processor would reenter the HALT state.

Whereas many alterations and modifications to the present invention will no doubt become apparent to the person of ordinary skill in the art after having read the foregoing description, it is to be understood that the particular embodiments shown and described by way of illustration are in no way intended to be limiting. For example, although this disclosure has shown a particular list of events that may be included as part of a microcode program for stopping the internal clock of a processor, other means are also possible without detracting from the spirit or scope of the present invention. Therefore, reference to the details of the illustrated diagrams is not intended to limit the scope of the claims which themselves recite only those features regarded as essential to the invention.

We claim:

1. A computer system including a resonator generating an oscillating signal and a unit for processing data in accordance with a sequence of instructions, said unit comprising:

a circuit having an input coupled to receive said oscillating signal, said circuit outputting a clock signal having a frequency which is a predetermined multiple of said oscillating signal said clock signal being coupled to first and second portions of said unit;

a microcode engine for executing said sequence of instructions, each instruction having boundaries and consisting of one or more microinstructions;

an input pin coupled to said microcode engine, assertion of said input pin causing said microcode engine to halt execution of said sequence of instructions on an instruction boundary, place said unit into a known state, and generate a stop signal;

a logic circuit coupled to said microcode engine and said input pin for decoupling said clock signal from said first portion of said unit in response to the assertion of said input pin and said stop signal.

2. The computer system of claim 1 further comprising:

system logic generating a plurality of interrupt signals; and wherein said unit further comprises an interrupt prioritizer coupled to receive said plurality of interrupt signals which includes an input signal coupled to said input pin, said interrupt prioritizer granting a high priority status to said input signal among said plurality of said interrupt signals.

3. The computer system of claim 1 wherein said logic circuit provides a mask signal in response to the assertion of said input pin and said stop clock, said logic circuit further comprising a means for logically ANDing said clock signal with said mask signal, said ANDing means having an output coupled to said first portion of said unit such that when said mask signal is in a first logical state said clock signal is decoupled from said first portion of said unit.

4. A computer system including:

a means for generating an oscillating analog signal;

means for multiplying said oscillating analog signal by a predetermined factor to produce a clock signal;

a data processor having a first portion operating synchronous with said clock signal, said data processor including a means for executing a program consisting of a sequence of instructions having boundaries; and means coupled to said execution means for halting said program on an instruction boundary and decoupling said clock signal from said first portion of said data processor.

5. A microprocessor comprising:

a central processing unit (CPU) core;

a clock input coupled to receive an oscillating analog signal;

a phase-locked loop circuit multiplying said oscillating analog signal by a predetermined factor to produce an internal clock signal coupled to said CPU core;

a plurality of inputs for receiving a corresponding plurality of interrupt signals, including a stop signal;

a microcode engine having an input coupled to receive said stop signal and an output bit, said microcode engine executing a program comprising a set of instructions having boundaries, each instruction including one or more microinstructions, said microcode engine also including a microcode routine which executes in response to said stop signal, said microcode routine placing said microprocessor into a known state, then setting said output bit;

a prioritizer coupled to said microcode engine and to said plurality of interrupt inputs for granting a priority status to said plurality of interrupt signals and for signaling said microcode engine to suspend execution of said computer program on a next instruction boundary in response thereto, said stop signal being granted a high priority interrupt status among said plurality of interrupt signals;

logic means for decoupling said internal clock signal from said CPU core in response to said stop signal and said output bit.

6. A method of masking a clock signal from at least a portion of a microprocessor comprising the steps of:

(a) providing an interrupt indicating that said clock signal is to be masked in response to the assertion of an external pin of said microprocessor;

(b) executing a routine within a microcode engine of said microprocessor in response to said interrupt to place said microprocessor in a known state; and (c) signaling by said microcode engine to a logic circuit to assert a signal to mask said clock signal from said at least a portion of said microprocessor.

7. The method defined by claim 6 further comprising the steps of:

(d) waiting by said microcode engine until said external pin is deasserted.

8. The method according to claim 6 further comprising the steps, prior to step (c) of:

emptying said microprocessor of active bus cycles;

stopping the prefetcher within said microprocessor from prefetching.

9. The method according to claim 6 further comprising the steps of:

deasserting said external pin;

recoupling the clock signal to said at least a portion of said microprocessor;

terminating said routine.

10. The method according to claim 8 further comprising the step, after said emptying step, of:

generating a bus cycle acknowledging the masking of said clock signal.

11. A microprocessor comprising:

means for generating an internal clock signal from an external oscillatory analog signal, the internal clock signal being provided to first and second portions of the microprocessor;

an execution unit which executes a stream of instructions synchronous to the internal clock signal, the instructions in the stream being separated by boundaries, at least one of the instructions requiring more than one period of the internal clock signal to complete execution, the execution unit storing a microcode routine which, when executed, places the microprocessor in a known state and then sets an internal bit;

an external pin for receiving a stop signal during execution of a current instruction and asynchronous to the internal clock signal;

interrupt means coupled to the execution unit and to the external pin, the interrupt means for responding to the stop signal by signaling the execution unit to execute the microcode routine, the microcode routine setting the internal bit on a next boundary of the current instruction;

logic means coupled to the execution unit, the interrupt means, and the internal clock signal for masking the internal clock signal to the first portion of the microprocessor, but not to the second portion of the microprocessor, in response to the internal bit.

12. The microprocessor of claim 11 wherein the means for generating the internal clock signal comprises a phase-locked loop circuit.

13. The microprocessor of claim 11 wherein the interrupt means comprises an interrupt prioritizer operable to detect a plurality of interrupt events external to the microprocessor and then grant a priority status to each of the interrupt events, the stop signal being included within the interrupt events and being accorded a high priority status by the interrupt prioritizer.

14. The microprocessor of claim 13 wherein the microprocessor further comprises a bus unit and an internal pipeline, and wherein execution of the microcode routing empties the bus unit of outstanding bus cycles and flushes the internal pipeline prior to setting the internal bit.

15. The microprocessor of claim 14 wherein the bus unit generates an acknowledge bus cycle prior to setting the internal bit.

16. The microprocessor of claims 11, 12, 13, 14 or 15 wherein the second portion of the microprocessor comprises the bus unit and includes snooping logic operating from the internal clock signal.

17. A method of operating a microprocessor coupled to receive an external oscillatory signal, the microprocessor having first and second portions, the method comprising the steps of:

(a) generating an internal clock signal from the external oscillatory signal, the internal clock signal being coupled to the first and second portions of the microprocessor;

(b) receiving an external stop signal coupled to the microprocessor, the external stop signal being received asynchronous to the internal clock signal;

(c) halting the execution of a current instruction which is part of a stream of instructions having boundaries, at a next instruction, boundary in response to the external stop signal;

(d) masking the internal clock signal from the first portion of the microprocessor in response to the external stop signal; and (e) continuing to couple the internal clock signal to the second portion of the microprocessor.

18. The method according to claim 17 wherein the current instruction requires multiple periods of the internal clock signal to complete execution.

19. The method according to claim 17 further comprising the step, after step (c), of:

setting an internal bit within the microprocessor, and wherein step (d) occurs in response to the setting of the internal bit and the receiving of the external stop signal.

20. The method according to claim 17 further comprising the step, prior to step (d), of:

executing a microcode routine that places the microprocessor in a stable state.

21. The method according to claim 20 wherein the microprocessor further includes a bus unit producing bus cycles and pipelines, and wherein the executing step comprises the steps of:

emptying the bus cycles in the bus unit of the microprocessor; and emptying the pipelines.

22. The method according to claims 17, 18, 19, 20 or 21 further comprising the step, after step (e), of:

(g) unmasking the internal clock signal, thereby recoupling the internal clock signal to the first portion of the microprocessor, in response to deassertion of the external stop signal; and (h) beginning execution of a new instruction on the next instruction boundary.

* * * * *

UNITED STATES PATENT AND TRADEMARK OFFICE
CERTIFICATE OF CORRECTION

PATENT NO.    :  5,473,767
DATED         :  December 5, 1995
INVENTOR(S)   :  Kardach et al.

It is certified that error appears in the above-identified patent and that said Letters Patent is hereby corrected as shown below:

In column 1 at line 52 delete "lccp" and insert --loop--

In column 1 at line 58 delete "lccp" and insert --loop--

In column 1 at line 63 delete "am" and insert --are--

In column 4 at line 8 delete "lccp" and insert --loop--

In column 5 at line 7 delete "lccp" and insert --loop--

In column 5 at line 10 delete "lccp" and insert --loop--

Signed and Sealed this

Fourth Day of February, 1997

Attest:

BRUCE LEHMAN

Attesting Officer　　　Commissioner of Patents and Trademarks